United States Patent [19]

Vranish

[11] Patent Number: 5,103,941
[45] Date of Patent: Apr. 14, 1992

[54] ROLLER LOCKING BRAKE

[75] Inventor: John M. Vranish, Crofton, Md.

[73] Assignee: The United States of America as Represented by the Administrator of the National Aeronautics & Space Administration, Washington, D.C.

[21] Appl. No.: 677,008

[22] Filed: Mar. 28, 1991

[51] Int. Cl.⁵ .................................................. B60T 13/04
[52] U.S. Cl. ................................ 188/171; 188/82.84; 188/82.9
[58] Field of Search ................. 188/171, 82.5, 82.84, 188/82.8, 267, 171, 173, 82.2, 82.1, 161, 163, 164, 162, 82.9, 265, 216, 30, 70 R, 156-159; 192/90; 310/77

[56] References Cited

U.S. PATENT DOCUMENTS

| | | | |
|---|---|---|---|
| 2,693,254 | 11/1954 | Barish | 188/171 |
| 3,068,975 | 12/1962 | Theuer | 188/171 X |
| 3,096,863 | 7/1963 | Shefke | 188/171 X |
| 3,169,607 | 2/1965 | Romney | 188/171 X |
| 3,198,293 | 8/1965 | Mathews | 188/171 X |
| 3,536,169 | 10/1970 | Arnold | 188/82.9 X |
| 3,812,936 | 5/1974 | Dane | 188/171 |
| 3,900,089 | 8/1975 | Ivey | 188/82.9 X |
| 4,119,310 | 10/1978 | Trubody | 188/82.9 X |

FOREIGN PATENT DOCUMENTS 115921  5/1988  Japan ..................... 188/161

Primary Examiner—Douglas C. Butler
Attorney, Agent, or Firm—R. Dennis Marchant; John R. Manning; Paul S. Clohan

[57] ABSTRACT

A roller locking brake structure includes a roller locking/lifting ring, a housing, a set of conical locking rollers, a striker ring and a drive disc. The roller locking/lifting ring includes respective V-shaped locking cam surface segments for each locking roller which is in the form of a truncated cone and provides a force and torque reaction surface for forces and torques generated in the braking process as well as providing a channel for a magnetic coil and flux return path of a magnetic circuit used to release a conical roller when the brake is off. The locking conical rollers couple the ring to the rim surface of the drive disc which provides another cam surface. The striker ring is located adjacent the rollers and is pulled down against the small end of the rollers by an electromagnetic coil when energized to decouple the locking rollers from the drive disc and thus cease the braking action.

14 Claims, 3 Drawing Sheets

ROLLER LOCKING BRAKE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to braking apparatus and more particularly to a brake that provides a holding torque sufficient to directly constrain the output torque of a rotary device.

Two types of electric brakes are generally known and commonly used with rotary devices such as electric motors and the like. One comprises the magnetic solenoid type brake, and the other comprises the less commonly used magnetic particle brake.

The solenoid brake typically functions to disengage the brake and employs a magnetic coil and an electrical energizing circuit to lift a spring-loaded abrasive clutch away from a reaction pad. To engage the brake, for example, the magnetic field is deenergized, allowing a bias spring to press the clutch against the reaction pad and lock the brake in place.

The magnetic particle brake, on the other hand, is constructed with a magnetic coil and a magnetic circuit which has a predefined gap in the flux return path. A fluid or powder with a heavy mixture of magnetic stainless steel particles is placed in the gap of the flux return path. When the magnetic coil is activated, the magnetic flux crosses the gap in the return path and lines up the magnetic particles such that the brake is locked. When the magnetic field is relaxed, the magnetic particles are demagnetized and again become part of the fluid or powder, as the case may be.

While such apparatus works extremely well for certain applications, the magnetic solenoid brake has certain limitations with respect to the holding torque which it can generate and therefore often requires the additional use of a transmission device such as a harmonic drive in order for it to operate as intended. This, however, limits its use options and restricts packaging. Since this type of brake operates upon generating a frictional hold, it can wear out with extended use.

The magnetic particle brake also is limited insofar as its holding torque is concerned. Also to power the magnetic particle brake a large and heavy magnetic circuit is required as well as an associated set of coils. The magnetic circuit and the coils are used directly to provide the braking torque and thus the power requirements and the heat build up can be considerable. Also, the magnetic particles through prolonged use tend to wear smooth, thereby diminishing its effectiveness. Moreover, it is cumbersome and complicated to construct the powder system and seals associated with it. For space applications, a magnetic fluid would not be acceptable.

SUMMARY

Accordingly, it is an object of the present invention to provide an improvement in electromechanical brakes.

It is another object of the invention to provide an improvement in electromechanical rotary type brakes.

It is a further object of the invention to provide a brake which operates to constrain the torque of a robotic member.

It is still another object of the invention to provide a locking brake for robotic apparatus which is compact, requires low power, and exhibits minimal heat build up.

And still a further object of the invention is to provide braking apparatus for a robot joint which includes the capability of locking without the application of power, yet electromagnetically releasable in real time on demand.

And still yet another object of the invention is to provide a highly efficient brake for robotic apparatus which is simple, reliable and able to function in diverse environments including outer space.

Briefly, the foregoing and other objects of the invention are achieved by a roller locking brake structure comprised of a roller locking/lifting ring, a housing, a set of locking rollers, a striker ring and a drive disc. The roller locking/lifting ring includes respective V-shaped locking cam surface segments for each locking roller which is in the form of a truncated cone and provides a force and torque reaction surface for forces and torques generated in the braking process as well as providing a channel for a magnetic coil and flux return path of a magnetic circuit used to release a locking cone when the brake is off. The locking conical rollers couple the ring to the rim surface of the drive disc which provides another cam surface. The striker ring is located adjacent the rollers and operates to decouple the rollers from the drive disc when the magnetic circuit is activated.

BRIEF DESCRIPTION OF THE DRAWINGS

The following detailed description will be more readily understood when considered together with the accompanying drawings in which.

DESCRIPTION OF THE PREFERRED EMBODIMENTS

Figure 1:
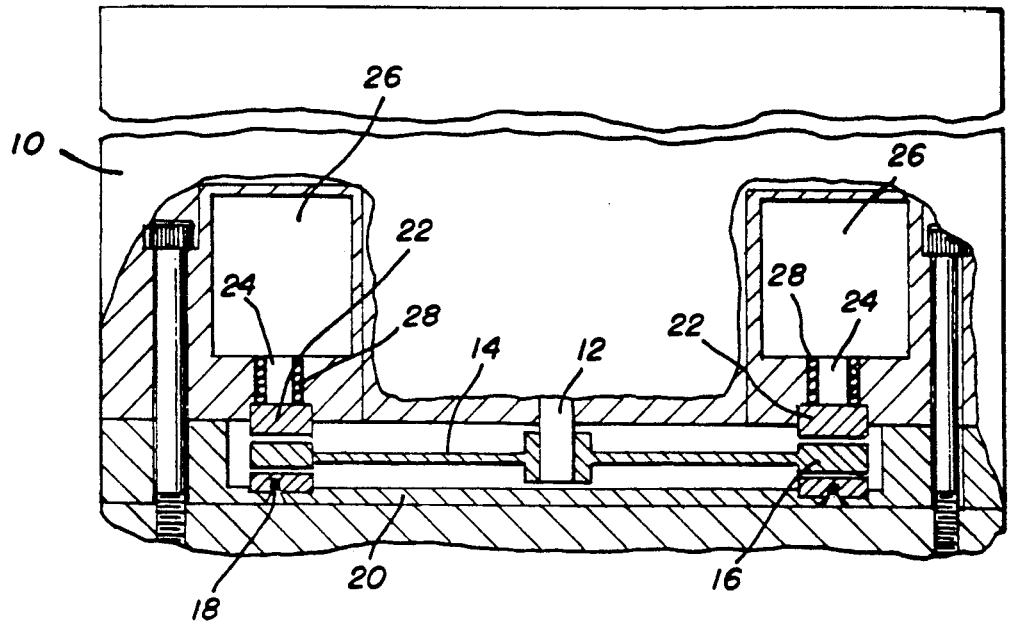
FIG. 1 is a partially cut-away sectional view generally illustrative of a magnetic solenoid brake in accordance with the known prior art.

Referring now to the drawings and more particularly to FIG. 1, reference numeral 10 generally denotes an electric motor which includes a solenoid brake coupled to its output shaft 12. The brake itself is comprised of a disc type of rotor 14 whose enlarged peripheral portion 16 is located between a fixed brake pad 18, which is in the form of a ring located in a support member 20, and one or more movable clutch type brake pads 22 which are attached to a solenoid shaft 24. The solenoid shaft 24 is activated by a solenoid coil 26.

The pads 22, moreover, are biased against the disc 14 by means of respective compression springs 28. Thus when the solenoids 26 are deenergized, the brake is engaged by the pressure exerted by pads 18 and 22 against the peripheral portion 16 of the disc 14. When the solenoids 26 are energized, the pads 22 retract and unlock the brake by permitting the disc rotor 14 to rotate.

Figure 3:
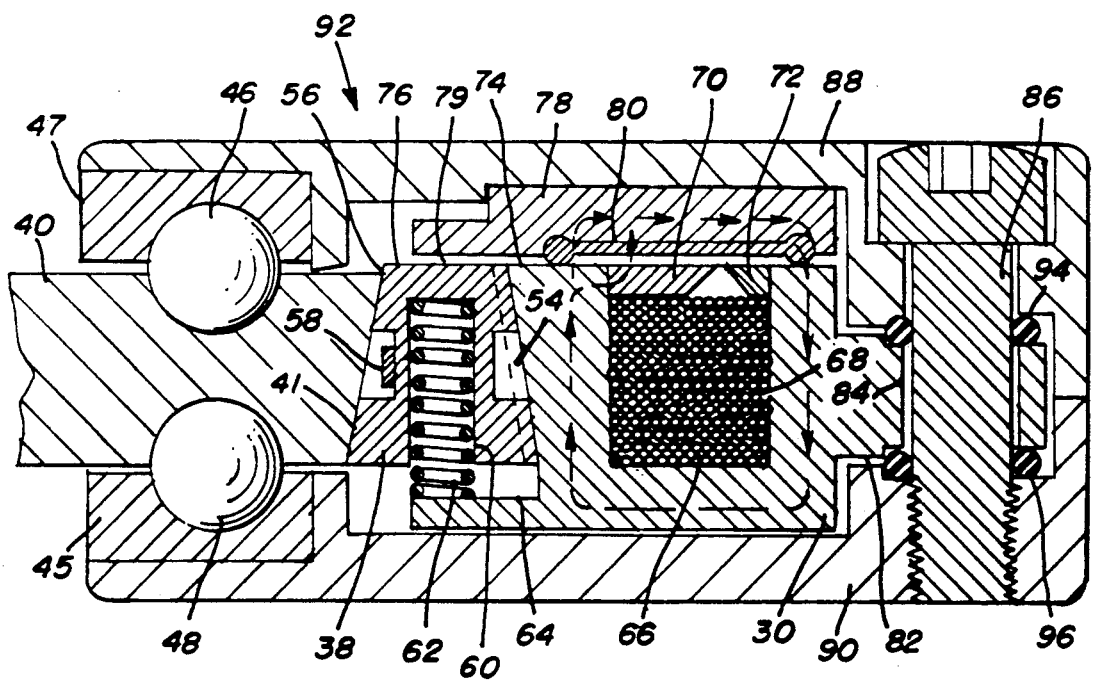
FIG. 3 is a cross sectional view of the embodiment shown in FIG. 2 taken along the line 3—3 thereof.
Figure 2:
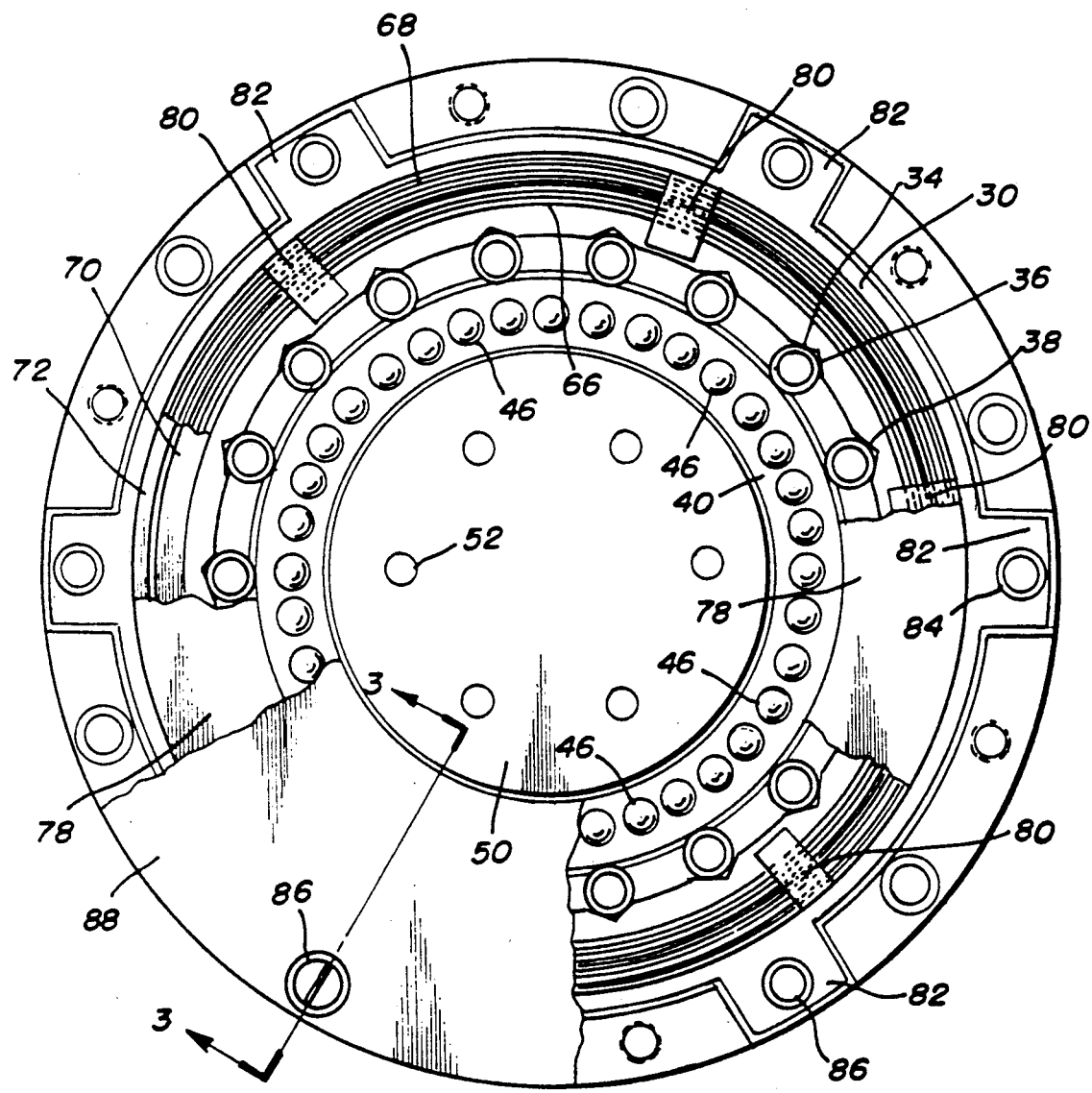
FIG. 2 is a partially cut-away top plan view of the preferred embodiment of the invention.
Figure 4:
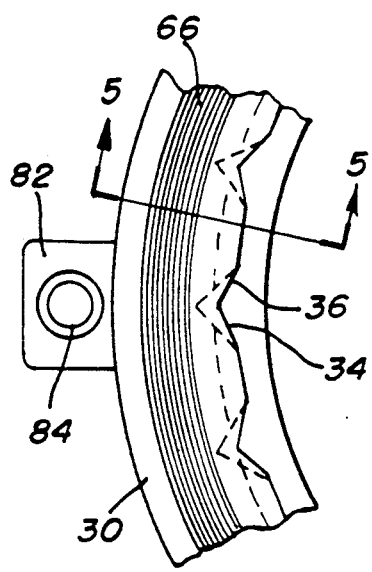
FIG. 4. is a partial plan view of the roller locking/lifting ring as shown in FIG. 2.
Figure 5:
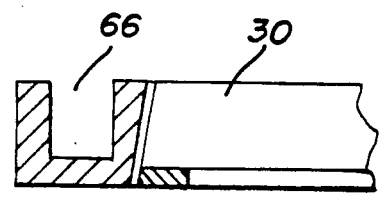
FIG. 5 is a sectional view of the portion shown in FIG. 4 taken along the line 5-5 thereof.
Figure 6:
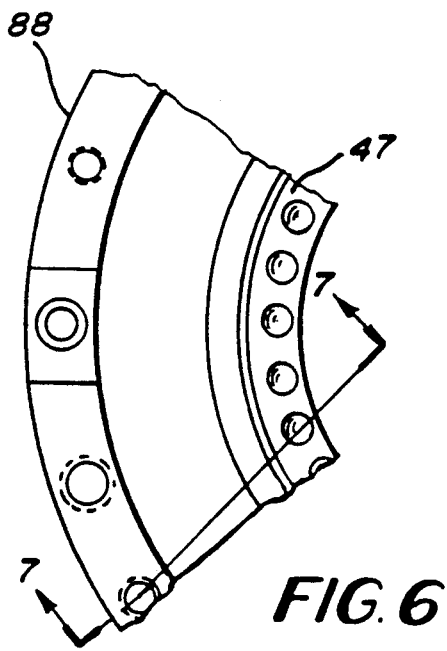
FIG. 6 is a partial planar view of the underside of the housing top portion of the embodiment shown in FIGS. 2 and 3.
Figure 7:
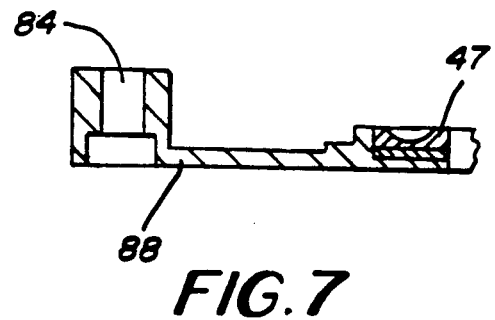
FIG. 7 is a sectional view of the portion shown in FIG. 6 taken along the line 7—7 thereof.

This now leads to a consideration of the preferred embodiment of the invention. As best shown in FIGS. 2 and 3, reference numeral 30 denotes a circular outer locking/lifter ring member having a plurality of mutually divergent cam segments comprised of oppositely sloped flat surfaces 34 and 36. The cam segments form an inwardly facing V-shaped portion which define clockwise and counterclockwise locking cams 34 and 36, respectively, and which engage respective truncated conical roller members 38 (FIG. 3). Each of the conical rollers 38 operates as locking devices and also engages the outer periphery flat rim surface 41 of a circular drive disc 40 which include two sets of equally spaced ball bearings 46 and 48 around the outer portion of the disc 40 adjacent the locking rollers 38. The rim surface 41 is angulated and also acts as a cam surface. The disc 40 also includes an inner portion 50 which is adapted to attach to a rotary shaft, for example, not shown, via a plurality of mounting holes 52.

Each of the locking rollers 38, moreover, includes a peripheral slot 54 formed midway along its outer surface 56 for receiving a radial spring member 58 for providing a radial preload force of the locking rollers 38 against the V-shaped locking cams 34 and 36. Each of the locking rollers 38, moreover, includes an axial bore 60 partly therethrough for receiving a compression spring member 62 which is seated on an inwardly extending shoulder portion 64 of the roller locking ring 30.

The locking/lifting ring 30. moreover, includes an annular slot 66 for the location of a multi-turn electromagnetic coil 68 which is held in place by a pair of retainer rings 70 and 72. Adjacent the outer surface portion 74 of the locking/lifting ring 30 and the smaller end surface 76 of the roller members 38 there is located an annular striker ring 78 which is offset therefrom by a set of equally spaced generally flat pre-load spring members 80 (FIG. 2) which bias the striker ring 78 outwardly from the roller members 38.

As shown in FIG. 2, the roller locking/lifting ring 30 incl. Jes six equally spaced outwardly projecting peripheral torque reaction ring segments 82 which includes a bolt hole 84 for receiving a respective threaded bolt 86 which is used to secure the upper and lower halves 88 and 90 of a housing structure 92 shown in FIG. 3 including the bearing races 45 and 47. Further as shown in FIG. 3, there are included a pair of compliant 0-ring members 94 and 96 on the upper and lower surfaces of the ring segments 82 at the location of the bolt hole 84 and act to relieve reaction forces in the load path as will be shown.

In operation, the conical roller members 38 couple the locking ring 30 to the drive disc 40. The striker ring 78 is normally spring-biased away from the magnetic coil 68 against the upper bearing member 88. The striker ring 78, however, is pulled down toward the coil 68 electromagnetically when energized to strike the surface 76 of the cones 38 and in doing so, decouple the conical rollers 38 from the inclined or angulated surface 41 of the drive disc 40.

In the locked mode, each of the cone rollers 38 are spring-biased by way of the spring 62 into the V-shaped cam surfaces 34 and 36 of the ring 30 against the angulated cam surface 41 of the drive disc 40. The rollers 38, as noted above, are also slightly preloaded radially outwardly from the center of the structure by the radial retaining spring 58. As the disc drive member 40 is turned, for example clockwise, the sets of ball bearings 46, 48 turn easily and the preloaded conical roller members 38 attempt to roll with the drive disc and up the clockwise locking cam segments 34 of the locking ring 30. However, the angle of the cam surface is a locking angle, i.e. 10°, so that the micromovement of each locking roller 38 attempts to stretch the roller locking ring 30, compress the drive disc 40, and flatten the roller cones 38. Thus the reaction forces on the truncated cones 38 build up very quickly. The frictional forces also increase at a rate faster than the force, i.e. torque, on the drive disc 40.

Thus the rolling cone members 38 cannot slide against the surface 41 of the disc drive 40 and are prevented from sliding up the clockwise cams 34 and accordingly roll as along as the locking ring 30 can stretch, the drive disc 40 can compress and the rollers 38 can flatten. The reaction forces, however, are asymmetric and include a component in the direction opposite that of the torque on the disc drive 40. As soon as the reacting torque matches the exciting torque, the conical roller members 38 lock and the drive disc 40 is restrained from any further rotation. The configuration shown can easily produce 100 ft/lb. braking torque.

In the unlocked mode, the electromagnet coil 68 is energized, acting to pull the striker ring 78 against each of the conical roller members 38, forcing the conical surfaces downwardly (FIG. 3) against the bias spring 62 and away from contact with the surface 41 of the disc drive 40 and are effectively disengaged. This permits the disc drive 40 to now freely rotate on the ball bearings 46 and 48. The electrical power required by the electromagnet coil 68 to keep the rollers 38 disengaged and the preload springs 62 compressed, is relatively small. Thus the heat produced and electrical power drain is minimal.

Considering now the transition from the locked mode to the unlocked mode, when the brake is locked and under a large torque, the contact forces on the conical rollers 38 are formidable. Thus, a motor shaft, not shown, attached to the brake must first produce enough torque to neutralize the forces on the bearings. Then the magnetic coil 68 in the roller locking/lifting ring 38 is also activated. The resulting magnetic field generated by energization of the coil 68 accelerates the striker ring 78 towards the surface 76 of the conical rollers 38, causing them to slide down the cam surface 41 and thus uncouple from the surface of the disc drive 40.

As shown in FIG. 3, the striker ring 78 is designed to have a reasonably large initial air gap 79 from the surfaces of the cones 38 and the adjacent surface 74 of the locking/lifting ring 30. This is to enable the rollers 38 to individually adjust upwardly in the gap 79 between the cam surfaces 34 and 36 (FIG. 2) and the cam surface 41 of the drive disc 40. Initially, the magnetic flux must cross the air gap 79 twice as shown by the arrows in order to complete its magnetic flux path. A relatively large magneto-motive force is generated. This force is more than adequate to disengage the rollers 38. As the conical rollers 38 are disengaged, the air gap 79 progressively decreases until the striker ring 78 comes to rest on the surface 74 of the locking ring 30, which results in a substantially zero air gap and accordingly very little current is thereafter required to maintain the brake in an unlocked mode.

In addition to and considering the structural arrangement of the various elements and their operation, it is also useful to consider the force management strategy which is employed. Two sets of separate load paths are used to manage loads along three mutually orthogonal axial directions and torques about these axes. The force management system is required in order to keep the brake from jamming in a locked configuration or operational mode. Both sets start with the drive disc 40 at the center and end with a force reacting structure at the outer ends of the roller locking/lifting ring 30 and more particularly the ring segments 82. One set passes through the ball bearing elements 46 and 48 and then through the split housing members 88 and 90 to the ring segments 82. The other set passes through the locking cones 38, through the roller locking/lifting ring 30, and then through the compliant O-rings 94 and 96 to the end segments 82. Because of the presence of the compliant O-rings 94 and 96 in the load path of the roller locking cones 38, the loads and torques generally follow the stiffer path through the ball bearings 46 and 48. The torque about the axis laterally transverse to radial direction is the exception. The ball bearings 46 and 48 are unable to oppose this torque, thus the conical roller members 38 roll initially. However, they soon begin to apply radial forces on the roller locking/lifting ring 30 and become locked. Thus the entire ring 30 begins to move against the compliant O-rings 94 and 96. The compliance is taken up and the roller locking/lifting ring 30 encounters the bolts 86 connecting the force reacting structural element 82 to the housing members 88 and 90 and rotation is thus stopped. Accordingly, the conical locking rollers 38 are able to brake rotation, but other forces and torques cannot accidentally jam the conical rollers 38.

It should be noted that when desirable, the relative position of the roller locking/lifting ring member 30 and the disc drive member 40 can be reversed. The only requirement is that the member which contains the electromagnetic coil 68 and the magnetic circuit associated therewith cannot be a continuously rotating member.

There are four main advantages to a braking arrangement as set forth herein. First, the holding torque for the size of the brake is superior to any competing device of similar size and shape. Second, the power required to operate the brake is relatively negligible which is ideal for space applications. Third, the brake in accordance with this invention would have substantially little or no wear and therefore infinite life. Fourth, the brake can have several different configurations, thus making the packaging very flexible.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

I claim:

1. An electromechanical rotary brake assembly comprising:
   a rotary member to be locked having a circumferential surface including a first generally flat continuous cam surface;
   a concentric substantially stationary locking/lifting ring having a circumferential surface including plural pairs of mutually divergent second cam surfaces, said second cam surfaces further being cam segments and wherein said pairs of second cam segments have a predetermined spaced relationship around said locking/lifting ring;
   a respective plurality of conical roller members located between the rotary member and the locking/lifting ring and coupling said first cam surface and said plural pairs of second cam segments, said roller members acting to contact said first cam surface and to roll up one of said divergent second cam surfaces and lock further rotation of said rotary member;
   means being selectively activated for thereafter decoupling said roller members from contact with said first cam surface and said second cam segments to permit rotation of said rotary member;
   said rotary member comprises a circular drive disk;
   said first generally flat continuous cam surface comprises an inwardly angulated outer rim surface of said drive disc and wherein said divergent second cam segments also comprise inwardly angulated flat surfaces to accommodate a conical surface of said roller members;
   said rotary member is located interiorly of said locking/lifting ring;
   said circumferential surface of said locking/lifting ring comprises an inner circumferential surface and wherein each said pair of second cam segments define a V-shaped concave cam region around said inner circumferential surface; and
   said means for decoupling said conical roller members includes striker plate means located adjacent a smaller end portion of said conical roller members and means for activating said striker plate means.

2. The brake assembly as defined by claim 1 wherein said striker plate means comprises an annular plate located adjacent a surface of said locking/lifting ring and extending over said smaller end portion of said conical roller members.

3. The brake assembly as defined by claim 2 wherein said annular plate comprises an electromagnetically activated plate and wherein said means for activating said annular plate comprises an electromagnetic coil mounted on said locking/lifting ring.

4. The brake assembly as defined by claim 3 wherein said coil is located in an annular slot formed in a surface of said locking/lifting ring.

5. The brake assembly as defined by claim 3 and additionally including bias spring means located between said locking/lifting ring and said annular plate for biasing said annular plate away from said ring when said electromagentic coil is deenergized.

6. The brake assembly as defined by claim 5 wherein said conical roller members comprise truncated cones having flat smaller and larger end surfaces.

7. The brake assembly as defined by claim 6 wherein each of said roller members include an axial bore in said larger end surface and additionally including a compression bias spring located in said bore and having one end contacting an outwardly extending shoulder portion of said locking/lifting ring.

8. The brake assembly as defined by claim 7 and wherein each of said roller members has a sloping outer surface and additionally including a recess formed in the sloping outer surface of said roller members and a band encircling said locking/lifting ring and fitted into said recesses for providing an outward radial bias force on said roller members.

9. The brake assembly as defined by claim 2 and additionally including housing means enclosing said annular plate, said locking/lifting ring and said conical roller members.

10. The brake assembly as defined by claim 9 wherein said housing means comprises a split housing including first and second housing members located on either side of said annular plate, said locking/lifting ring and said roller members and being fastened together through a hole located in at least one outer portion of said locking-/lifting ring.

11. The brake assembly as defined by claim 10 and additionally including housing member fastening means through said hole in said locking/lifting ring and additionally including compliance means between said first and second housing members and said at least one end portion of said locking/lifting ring.

12. The brake assembly as defined by claim 11 wherein said compliance means comprises a pair of resilient O-rings.

13. The brake assembly as defined by claim 12 and additionally including bearing means located between said drive disc and said first and second housing members adjacent said outer rim surface comprising said first cam surface of said drive disc.

14. The brake assembly as defined by claim 13 wherein said bearing means comprises first and second sets of ball bearings located in a respective circular race fitted in said first and second housing members.

* * * * *